July 25, 1950   J. F. LUDEMAN   2,516,224
SHAPING ATTACHMENT FOR METALWORKING LATHES
Filed Aug. 12, 1948   2 Sheets-Sheet 1

INVENTOR.
John F. Ludeman
BY Victor J. Evans & Co.
ATTORNEYS

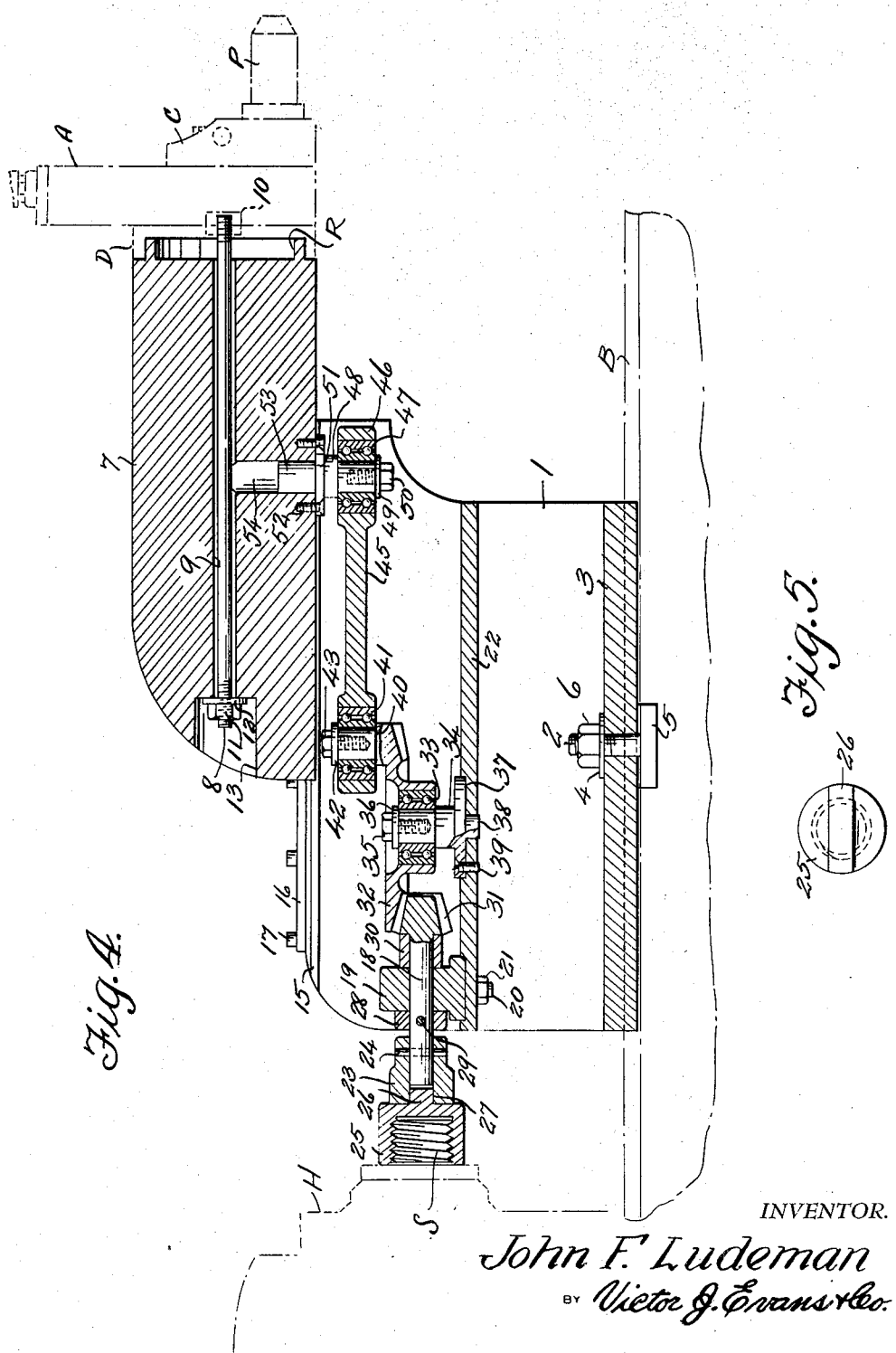

Patented July 25, 1950

2,516,224

UNITED STATES PATENT OFFICE 2,516,224

SHAPING ATTACHMENT FOR METAL-WORKING LATHES

John F. Ludeman, Short Hills, N. J.

Application August 12, 1948, Serial No. 43,872

4 Claims. (Cl. 90—39)

The present invention relates to the general class of combination metal working machines, and more specifically to a shaping attachment for metal working lathes by means of which a lathe may readily be converted for use in milling and planing operations, for gear cutting, and other general shaping work. The portable attachment may with facility be coupled to and longitudinally alined with the rotary spindle of a lathe, and it involves operating mechanism for translating and converting the rotary motion of the lathe into reciprocating movement and force of a standard machine tool. The compactly arranged operating mechanism includes a minimum number of parts that may be manufactured with facility and low cost of production, and the parts may be assembled with convenience to provide an appliance that may with ease be installed on the lathe, and to which a desired machine tool may be attached for cutting operations.

The invention consists in certain novel features of construction and combinations and arrangements of parts as will hereinafter be described and more particularly set forth in the appended claims.

In the accompanying drawings I have illustrated a complete example of a physical embodiment of my invention wherein the parts are combined and arranged in accord with one mode I have devised for the practical application of the principles of my invention. It will however, be understood that changes and alterations are contemplated and may be made in these exemplifying drawings, within the scope of my claims, without departing from the principles of the invention.

Figure 4 is a vertical longitudinal sectional view at line 4—4 of Fig. 1, showing by dotted lines the headstock of a lathe, and also a machine tool mounted on the front end of the shaper attachment; and Figure 5 is a detail view of part of the coupling for the lathe spindle.

Figure 1:
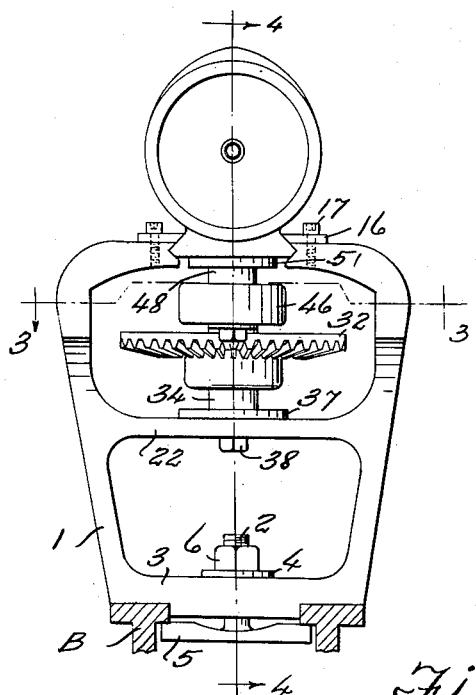
Figure 1 is a front end elevation of the attachment.
Figure 2:
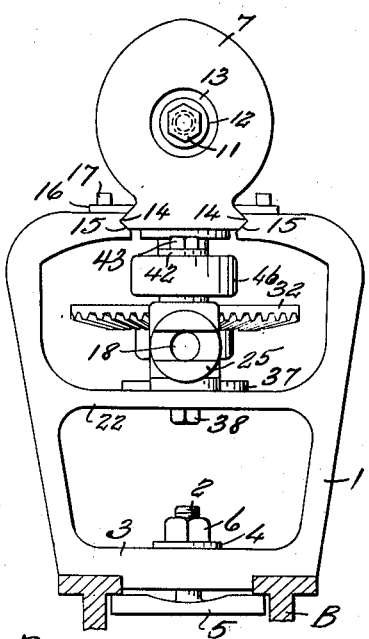
Figure 2 is a rear end elevation thereof.
Figure 3:
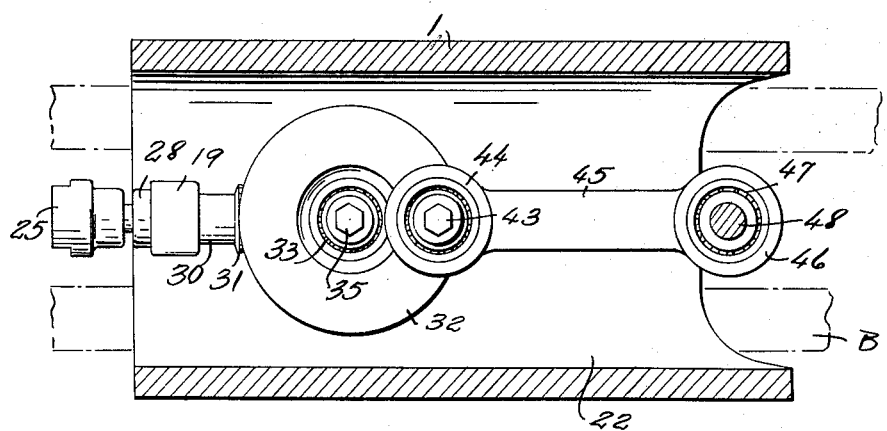
Figure 3 is a horizontal longitudinal sectional view at line 3—3 of Fig. 1.

In order that the general arrangement and relation of parts may readily be understood I have shown by dotted lines in Fig. 4 a portion of the headstock H of a lathe, and its rotary spindle or shaft S, the end of which is threaded and to which the shaper attachment is coupled. The shaper attachment is mounted on the bed B or longitudinally extending ways of the lathe, and by dotted lines a reciprocating machine tool is mounted at the front of the attachment including a tool post P, clapper C, and the vertical slide A mounted on a swivel head D.

The operating parts of the portable attachment are mounted on and enclosed within a casting 1 forming a frame or housing, and the housing is fastened in adjusted position on the bed B of the lathe by one or more hold-down bolts 2 passed through a hole in the bottom 3 of the housing and a washer 4, and the bolt is provided with a transverse head 5 clamped under the ways or bed B by lock nut 6.

A standard type of machine tool is shown by dotted lines in Fig. 4 as mounted with its swivel head D attached to a swivel ring R forming an integral part at the front end of a reciprocating ram 7 disposed in longitudinal alinement with the lathe. The machine tool is secured to the ram by means of a tie rod or bolt 8 which is passed through a central bore 9 of the ram, and a clamp nut 10 is threaded on the front end of the bolt or threaded rod to secure the swivel head, while a lock nut 11 with its washer 12 are located in a recess 13 in the rear end of the ram for rigidly holding the rod or bolt.

The ram of the attachment is reciprocated by its operating mechanism, and for this purpose the ram is equipped with spaced lateral tongues 14, 14, that slide in grooves 15 of the slotted top wall of the housing; retaining strips or plates 16, 16, being secured by screws 17 on the top of the housing, for holding down the reciprocating ram.

For taking off power from the rotating spindle S of the lathe, the shaper attachment is provided with an operating shaft 18 that is axially alined with the spindle and which extends longitudinally of the lathe in the rear part of the shaper housing. The shaft is rotatably journaled in a bearing 19 rigidly mounted by means of bolt 20 and locknut 21 in a horizontally disposed partition 22 located within and extending from end to end of the housing.

The operating shaft is detachably coupled to the spindle by means of a coupling head 23 fixed by cotter pin 24 on the end of the shaft, and a complementary socket member 25 threaded on the spindle and provided with a transverse lug or tongue 26 that seats in a groove 27 of the coupling head.

For accurately adjusting and securing the rotary shaft in operative position a collar 28 is secured by pin 29 on the shaft at one side of the journal bearing, and a spacer or bushing 30 is mounted at the other side of the bearing between the bearing and a bevel pinion 31 rigid with the front end of the shaft.

The bevel pinion meshes with the under side of a bevel gear 32 disposed in a horizontal plane and journaled by ball bearings 33 on the reduced end of a stud axle 34, and a bolt 35 with its washer 36 retains the gear and its bearing on the axle. For rigidly mounting the axle it is provided with a base flange 37 seated in a recess of the partition and a centering pin 38 in a socket of the partition, and an attaching screw 39 fastens the flange to the partition.

The rotary movement of the bevel gear is translated into reciprocating movement of the ram, and for this purpose the bevel gear is equipped with an upstanding integral stud or fulcrum pin 40 and a ball bearing 41 retained by washer 42 and bolt 43, within an end bushing 44 of a connecting rod 45, mounted within the upper portion of the housing.

The forward end of the connecting rod is provided with a journal bushing 46 that is mounted by ball bearings 47 on the reduced end of a stud axle 48 carried by the ram and projecting downwardly through the slotted top wall of the housing, and a washer 49 and bolt 50 at the underside of the connecting rod secure the bearing and bushing on the stud 48.

For mounting the stud on the under face of the ram, the stud is fashioned with a base flange 51 secured by screw bolts 52 to the ram, and a centering pin 53 of the stud is seated in a recess 54 opening at the lower face of the ram.

It will be apparent that the operating mechanism including the pinion and gear arrangement effects a reduced speed imparted to the reciprocating ram and the machine tool with a powerful stroke required in some metal work, and higher speeds may be attained, with quicker strokes of the machine tool, by use of the stepped pulleys of the standard lathe.

For equipping a lathe with the shaper attachment, the usual tool carriage assembly is removed, and a suitable work holder is substituted therefor, and the ram is designed to employ a standard type of tool head, swiveled as indicated by dotted lines, for adjustment at various angles and the necessary feed of the tool.

Having thus fully described my invention, what I claim as new and desire to secure by Letters Patent is:

1. In a shaper attachment for a lathe having a rotary driven spindle, the combination with a housing and means for mounting it on the lathe, a reciprocable ram mounted on the housing and a stud axle rigid therewith, a swivel element rigid with the ram, a tie-bolt mounted in the ram, and lock nuts on said bolt for retaining a tool in swivel relation to the ram, of an operating shaft journaled in the housing and axially alined with the spindle, means for coupling the shaft and spindle, a bevel pinion on the shaft and a complementary bevel gear journaled in the housing, a fulcrum pin rigid with the gear and a spaced stud axle rigid with the ram, and an actuating rod operatively connecting the fulcrum pin and stud axle.

2. In a shaper attachment for a lathe having a driven rotary spindle, the combination with a housing and means for mounting it on the lathe, a reciprocable ram mounted on the housing and a stud axle rigid therewith, a swivel element rigid with the ram, a tie-bolt mounted in the ram, and lock nuts on said bolt for retaining a tool in swivel relation to the ram, of an operating shaft journaled in the housing and axially alined with the spindle, a detachable coupling between the shaft and spindle, a bevel pinion on the shaft and a complementary bevel gear journaled in the housing, a fulcrum pin rigid with the gear, and an actuating rod operatively connecting the stud axle and fulcrum pin.

3. Operating mechanism for converting the rotary movement of a lathe spindle into reciprocating movement of a ram and its shaping tool comprising a housing supporting the ram and means for mounting the housing on the lathe, a stud axle rigid with the ram, a swivel element rigid with the ram, a tie bolt mounted in the ram, lock nuts on said bolt for retaining a tool in swivel relation to the ram, an operating shaft axially alined with the spindle and journaled in the housing, a detachable coupling between the shaft and the spindle, a bevel pinion rigid with the shaft and a complementary bevel gear journaled in the housing, and means operatively connecting the bevel gear and ram for translating rotary movement of the former into reciprocating movement of the latter.

4. Operating means for converting the rotary movement of a lathe spindle into reciprocating movement of a ram and its shaping tool comprising a housing having a slotted top wall and co-acting means on the slotted wall and ram for retaining and guiding the latter, a stud axle rigid with the ram, a swivel element rigid with the ram, a tie bolt mounted in the ram, lock nuts on said bolt for retaining a tool in swivel relation to the ram, and a connecting rod journaled at one end on the axle, of an operating shaft journaled in the housing and axially alined with the spindle, a detachable coupling between the shaft and spindle, and a bevel-gear-couple operatively connecting the operating shaft with the connecting rod.

JOHN F. LUDEMAN.

REFERENCES CITED

The following references are of record in the file of this patent:

UNITED STATES PATENTS

| Number | Name | Date |
|---|---|---|
| 278,084 | Bogert | May 22, 1883 |
| 490,670 | Mills et al. | Jan. 31, 1893 |
| 636,127 | Flather | Oct. 31, 1899 |
| 2,408,876 | Pigott et al. | Oct. 8, 1946 |